(No Model.)
A. JOHNSON.
Car Brake.
No. 235,152. Patented Dec. 7, 1880.
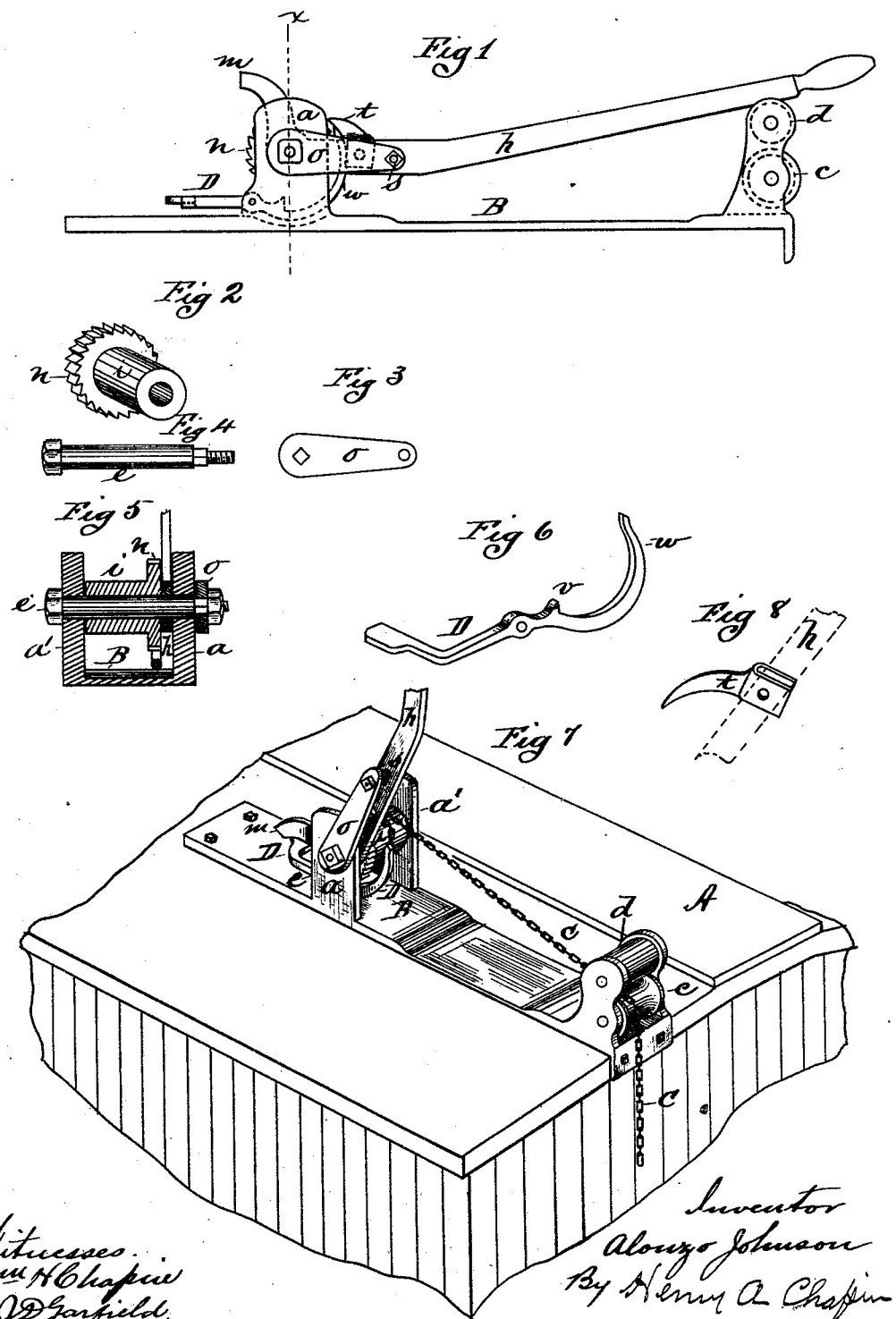
Witnesses
Wm H Chapin
J D Garfield
Inventor
Alonzo Johnson
By Henry A Chapin
Atty

UNITED STATES PATENT OFFICE.

ALONZO JOHNSON, OF SPRINGFIELD, MASSACHUSETTS, ASSIGNOR OF ONE-HALF TO JAMES B. ATWOOD, OF SAME PLACE.

CAR-BRAKE.

SPECIFICATION forming part of Letters Patent No. 235,152, dated December 7, 1880.

Application filed September 27, 1880. (No model.)

*To all whom it may concern:*

Be it known that I, ALONZO JOHNSON, a citizen of the United States, residing at Springfield, in the county of Hampden and State of Massachusetts, have invented new and useful Improvements in Car-Brake Mechanisms, of which the following is a specification.

My invention relates to devices for operating the brakes of railway-cars, and more particularly those of freight-cars; and the object thereof is to provide a practical substitute for the dangerous vertical brake-shaft surmounted by a hand-wheel in common use upon the end of freight-cars, and to provide an improved brake mechanism to be located upon the roof of the car and at a safe distance from its end.

I attain the above-named objects by the construction illustrated in the accompanying drawings, in which—

Figure 1 is a side elevation of my improved brake mechanism detached from the car. Fig. 2 is a view of the chain-drum and ratchet. Fig. 3 is a view of an arm connecting the brake-lever with the pivot-bolt, Fig. 4. Fig. 5 is a sectional view through line $x\ x$, Fig. 1. Fig. 6 is a view of the trip-lever and pawl. Fig. 7 is a view of a portion of the roof of a car with my brake mechanism in position thereon. Fig. 8 is a view of the pawl and a portion of the brake-lever.

Like letters refer to like parts in the several figures.

A is a portion of the roof of a car. B is a bed-piece, provided with proper roller-supports for the chain-roller $c$ and for a cylinder or block, $d$, of rubber or other elastic material.

Vertical supports $a\ a'$ rise up on each side of bed B, between which, upon a pivot-bolt, $e$, is hung the chain-drum $i$, provided with a ratchet, $n$. Between the inner face of support $a$ and the ratchet $n$ the lower end of the brake-lever $h$ is pivoted on bolt $e$.

An arm, $o$, is fitted upon a squared portion of bolt $e$, outside of support $a$, and there held when the nut on said bolt is screwed up. Said arm $o$ has its upper end secured to lever $h$ by a properly-fitted bolt, $s$, which passes through said lever and holds said arm in the position relative to said lever shown in Fig. 7.

Between bolt $s$ and the lower end of lever $h$ is pivoted a pawl, $t$, of the form shown in Fig. 8, which, when said lever is operated, engages in ratchet $n$ and causes the chain-drum $i$ to be intermittently rotated.

Pivoted to support $a$, as seen in Fig. 1, is a stop and trip lever, D, provided with a stop, $v$, and an upwardly-curved arm, $w$.

The above-named lever $h$ is the principal operating-lever of the mechanism, and its lower end is bent at right angles, or nearly so, to its long arm, and curved as shown in Figs. 1 and 7, forming an arm, $m$, which, when said lever is up in the position shown in Fig. 7, reaches out over bed B.

A chain, C, is secured to drum $i$, and leads from thence out over roller $c$ and down the end of the car, providing a suitable connection, by passing it over a roller upon the bottom edge of the car, for attaching the car-brake mechanism to the brakes thereunder.

The bed B, with the above-described mechanism attached thereto, is properly secured to the roof of the car in the position shown in Fig. 7.

The operation of my brake mechanism is as follows: When lever $h$ lies in the position shown in Fig. 1 the chain-drum is free to rotate on bolt $e$, leaving the chain C quite free and slack, so that the brakes with which it is connected can swing unobstructedly away from the car-wheels. Said chain-drum has been disconnected from the pawl $t$ by the contact of the end of arm $w$ on lever D with said pawl, as will be hereinafter more fully described.

When the brakeman would apply the brakes he seizes lever $h$ by its long arm, draws it up to, or about to, the position shown in Fig. 7, lifting pawl $t$ away from the end of said arm $m$, and said pawl is now free to fall into engagement with ratchet $n$. At the same time the operator places his foot upon the treadle end of lever D. This throws stop $v$ on said lever up against the under edge of said ratchet, causing it while so held to engage therewith. The operator now swings lever $h$ back and forth, rotating drum $i$ intermittently, stop $v$ on lever D serving to hold it against the strain of the brake-chain each time that lever $h$ is swung backward, and thus chain C is wound around said drum and the brakes drawn against the car-wheels. Arm $m$ on lever $h$ allows said lever to be swung only a limited distance in winding said chain onto drum $i$, as it strikes the top of bed B if swung beyond its limit. This provision guards against any accident to the operator in case the brake-chain or other part of the brake apparatus below should give way under strain, letting said lever fall, with the operator upon the roof of the car.

It is desirable that lever $h$ should be caused to maintain nearly an upright position when the brake is being worked, even though the operator should let go of it for a moment; otherwise it would by its own weight fall toward the end of the car and cause pawl $t$ to be disengaged from ratchet $n$, in which case drum $i$ would revolve and let off the brakes. To provide against the said contingency I connect lever $h$ and bolt $e$ one to the other in such a way that the strain of the brake-chain upon said bolt through drum $i$ is utilized to hold up lever $h$, as aforesaid, while the brake is being worked. To this end I connect said lever to arm $o$, and the latter being fitted to the squared portion of bolt $e$, it is obvious that when lever $h$ is swung back and forth bolt $e$ rocks in its bearings, and that when drum $i$ is, by the said strain of chain C upon it, drawn strongly against said bolt, the latter will so far resist said rocking motion as to cause it to support said lever, as aforesaid. Lever $h$ may be frictionally connected with bolt $e$ to produce the above-named result, but a positive connection, as just described, is much better.

When the brakeman desires to "let off" the brakes he moves lever $h$ slightly in a direction from the end of the car, places his foot under lever D, throwing it up and disengaging stop $v$ from ratchet $n$ and letting lever $h$ swing over upon the elastic block $d$, pawl $t$ strikes arm $w$ on lever D, disengaging said pawl from ratchet $n$ and leaving drum $i$ free to turn and free the brake-chain.

The above-described devices so operate as to take up any stretch of the brake-chain and to compensate for any wear of parts in the same way that a common wheel-brake operates, but with no danger to the brakeman, as is the case when the old style brake gives way or the wheel breaks or comes off from the rod; and, furthermore, my improved devices provide for the application of great power to the brakes without a laborious effort on the part of the operator.

The pawl $t$ is pivoted upon lever $h$ in the manner shown in Fig. 8—that is to say, so that it can swing limitedly on its pivot for the purpose of preventing it from swinging clear over when lever $h$ is thrown down, as in Fig. 1.

What I claim as my invention is—

1. The combination, in a car-brake, of a drum attached to the brake-chain and provided with a ratchet, a lever carrying a pawl arranged opposite said ratchet, and a device, D, whereby said pawl may be lifted from the ratchet and released, substantially as set forth.

2. The combination, with the lever $h$, of a spindle, $e$, connected immovably to said lever, and a chain-drum, $i$, turning loosely on the spindle and provided with a ratchet adapted to a pawl carried by the lever, substantially as and for the purpose set forth.

3. The combination, with the winding-drum and ratchet of a car-brake, of a lever, $h$, provided with a stop-arm, $m$, substantially as and for the purpose set forth.

ALONZO JOHNSON.

Witnesses:
WM. H. CHAPIN,
HENRY KNOX.